United States Patent
Kim et al.

(10) Patent No.: US 9,497,755 B2
(45) Date of Patent: Nov. 15, 2016

(54) METHOD FOR TRANSCEIVING CONTROL INFORMATION, AND APPARATUS FOR SAME

(71) Applicant: LG ELECTRONICS INC., Seoul (KR)

(72) Inventors: Myoungseob Kim, Anyang-si (KR); Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/430,485

(22) PCT Filed: Oct. 7, 2013

(86) PCT No.: PCT/KR2013/008939
§ 371 (c)(1),
(2) Date: Mar. 23, 2015

(87) PCT Pub. No.: WO2014/058194
PCT Pub. Date: Apr. 17, 2014

(65) Prior Publication Data
US 2015/0245324 A1 Aug. 27, 2015

Related U.S. Application Data

(60) Provisional application No. 61/711,199, filed on Oct. 8, 2012, provisional application No. 61/718,197, filed on Oct. 25, 2012.

(51) Int. Cl.
*H04W 72/04* (2009.01)
*H04L 5/00* (2006.01)
(Continued)

(52) U.S. Cl.
CPC .......... *H04W 72/042* (2013.01); *H04J 13/10* (2013.01); *H04L 1/0072* (2013.01);
(Continued)

(58) Field of Classification Search
None
See application file for complete search history.

(56) References Cited

U.S. PATENT DOCUMENTS

2009/0136034 A1* 5/2009 Gaal ................ G06F 7/584
380/268
2009/0323957 A1* 12/2009 Luo ................. H04J 11/0069
380/270

(Continued)

FOREIGN PATENT DOCUMENTS

WO    2012/109542    8/2012

OTHER PUBLICATIONS

PCT International Application No. PCT/KR2013/008939, Written Opinion of the International Searching Authority dated Jan. 28, 2014, 19 pages.

(Continued)

*Primary Examiner* — Min Jung
(74) *Attorney, Agent, or Firm* — Lee, Hong, Degerman, Kang & Walmey

(57) ABSTRACT

The present invention relates to a wireless communication system. In detail, provided are a method by which a terminal receives a control channel signal in a wireless communication system, and an apparatus for same, including the steps of: receiving a subframe including a plurality of control channel sets, wherein each control channel set includes a plurality of control channel candidates; and monitoring at least one control channel set in the subframe for receiving the control channel signal, wherein the plurality of control channel candidates are scrambled by a scrambling sequence having a control channel set-specific initialization value in each control channel set.

14 Claims, 12 Drawing Sheets

(51) Int. Cl.
- H04L 25/03 (2006.01)
- H04L 27/26 (2006.01)
- H04L 1/00 (2006.01)
- H04W 76/04 (2009.01)
- H04J 13/10 (2011.01)

(52) U.S. Cl.
CPC ...... *H04L 5/0053* (2013.01); *H04L 25/03866* (2013.01); *H04L 27/2613* (2013.01); *H04W 72/0446* (2013.01); *H04W 76/046* (2013.01)

(56) References Cited

U.S. PATENT DOCUMENTS

| | | | |
|---|---|---|---|
| 2011/0038310 A1* | 2/2011 | Chmiel | H04J 11/0069 370/328 |
| 2011/0077038 A1* | 3/2011 | Montojo | H04B 7/024 455/507 |
| 2013/0034064 A1* | 2/2013 | Nam | H04W 72/1294 370/329 |
| 2013/0194931 A1* | 8/2013 | Lee | H04L 5/0053 370/241 |
| 2014/0078978 A1* | 3/2014 | Cheng | H04L 5/0053 370/329 |

OTHER PUBLICATIONS

Huawei, "Details of ePDCCH scrambling sequence generator initialization," 3GPP TSG RAN WG1 Meeting #69, R1-121960, May 2012, 3 pages.
Catt, "DMRS scrambling sequence for E-PDCCH, 3GPP TSG RAN WG1 Meeting #70, R1-123226," Aug. 2012, 3 pages.
Texas Instruments, "Scrambling sequence initialization of DMRS for ePDCCH," 3GPP TSG RAN WG1 #70, R1-123196, Aug. 2012, 4 pages.
Hitachi Ltd., "DMRS scrambling sequence for ePDCCH," 3GPP TSG RAN WG1 Meeting #69, R1-122707, May 2012, 4 pages.
PCT International Application No. PCT/KR2013/008939, Written Opinion of the International Searching Authority dated Jan. 28, 2014, 13 pages.
Samsung, "Further Issues in PHICH-triggered PUSCH Retransmissions" 3GPP TSG RAN WG1 #63, R1-106044, Nov. 15-19, 2010, 5 pages.
Motorola Mobility, "Configuration of EPDCCH" 3GPP TSG RAN WG1 #70, R1-123788, Aug. 13-18, 2012, 6 pages.
Intel Corporation, "EPDCCH Scrambling Sequence Generation" 3GPP TSG-RAN WG1 #70bis, R1-124121, Oct. 3-12, 2012, 6 pages.
New Postcom, "Remaining Details of eCCE and eREG design" 3GPP TSG RAN WG1 #70bis, R1-124226, Oct. 3-12, 2012, 4 pages.

* cited by examiner

\*: Scrambling initialization value
$$c_{init} = X \cdot 2^{14} + q \cdot 2^{13} + \lfloor n_s/2 \rfloor \cdot 2^9 + ID_k$$

METHOD FOR TRANSCEIVING CONTROL INFORMATION, AND APPARATUS FOR SAME

CROSS-REFERENCE TO RELATED APPLICATIONS

This application is the National Stage filing under 35 U.S.C. 371 of International Application No. PCT/KR2013/008939, filed on Oct. 7, 2013, which claims the benefit of U.S. Provisional Application Ser. No. 61/711,199, filed on Oct. 8, 2012 and 61/718,197, filed on Oct. 25, 2012, the contents of which are all hereby incorporated by reference herein in their entirety.

TECHNICAL FIELD

The present invention relates to a wireless communication system, and more particularly, to a method of transceiving control information and an apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

One object of the present invention is to provide a method of efficiently transmitting/receiving control information in a wireless communication and an apparatus therefor. Another object of the present invention is to provide a method of efficiently transmitting/receiving a control channel signal and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a control channel signal by a user equipment in a wireless communication system, includes receiving a subframe including a plurality of control channel sets, wherein each of a plurality of the control channel sets includes a plurality of control channel candidates, and monitoring at least one control channel set in the subframe for receiving the control channel signal, wherein a plurality of the control channel candidates in each of the plurality of the control channel sets are scrambled by a scrambling sequence including $c_{init}$ of a following equation as an initialization value:

$$c_{init}=X \cdot 2^{14}+q \cdot 2^{13}+\lfloor n_s/2 \rfloor \cdot 2^9+ID_k \qquad \text{Equation}$$

where, X is an integer including 0, q is an integer including 0, $n_s$ is a slot number in a radio frame, $ID_k$ is identification information defined for a control channel set #k, and $\lfloor \; \rfloor$ is a flooring function.

To further achieve these and other advantages and in accordance with the purpose of the present invention, according to a different embodiment, a user equipment configured to receive a control channel signal in a wireless communication system includes an RF (radio frequency) unit and a processor, the processor configured to receive a subframe including a plurality of control channel sets, wherein each of a plurality of the control channel sets includes a plurality of control channel candidates, the processor configured to monitor at least one control channel set in the subframe for receiving the control channel signal, wherein a plurality of the control channel candidates in each of the plurality of the control channel sets are scrambled by a scrambling sequence including $c_{init}$ of a following equation as an initialization value:

$$c_{init}=X \cdot 2^{14}+q \cdot 2^{13}+\lfloor n_s/2 \rfloor \cdot 2^9+ID_k \qquad \text{Equation}$$

where, X is an integer including 0, q is an integer including 0, $n_s$ is a slot number in a radio frame, $ID_k$ is identification information defined for a control channel set #k, and $\lfloor \; \rfloor$ is a flooring function.

Preferably, X=0 and q=0.

Preferably, the scrambling sequence c(n) is given by a following equation:

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \qquad \text{Equation}$$

where, n=0, 1, ..., $M_{PN}$−1, $M_{PN}$ is a sequence length, $N_C$=1600, $x_1(0)$=1, $x_1(n)$=0, n=1, 2, ..., 30, and $\sum_{i=0}^{30} x_2(i) \cdot 2^i = c_{init}=X \cdot 2^{14}+q \cdot 2^{13}+\lfloor n_s/2 \rfloor \cdot 2^9+ID_k$.

Preferably, the control channel signal is an E-PDCCH (enhanced physical downlink control channel) signal, the plurality of the control channel sets is a plurality of E-PDCCH sets, and the plurality of the control channel candidates is a plurality of E-PDCCH candidates.

Preferably, the monitoring includes decoding each of the plurality of the control channel candidates in a corresponding control channel set using the scrambling sequence.

Preferably, the present invention further includes receiving an RRC (radio resource control) message including RB (resource block) allocation information on each of the plurality of the control channel sets.

Preferably, the plurality of the control channel candidates is multiplexed with PDSCH (physical downlink shared channel) in the subframe using an FDM (frequency division multiplexing) scheme.

Advantageous Effects

According to the present invention, control information can be efficiently transmitted and received in a wireless communication system. And, a control channel signal can be efficiently transmitted and received.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA and LTE-A (LTE-Advanced) is an evolved version of 3GPP LTE.

For clarity, the following description mainly concerns 3GPP LTE system or 3GPP LTE-A system, by which the technical idea of the present invention may be non-limited. And, specific terminologies used in the following description are provided to help the present invention to be understood. The specific terminologies can be modified into a different form within a range not deviating from a technical idea of the present invention.

Figure 1:
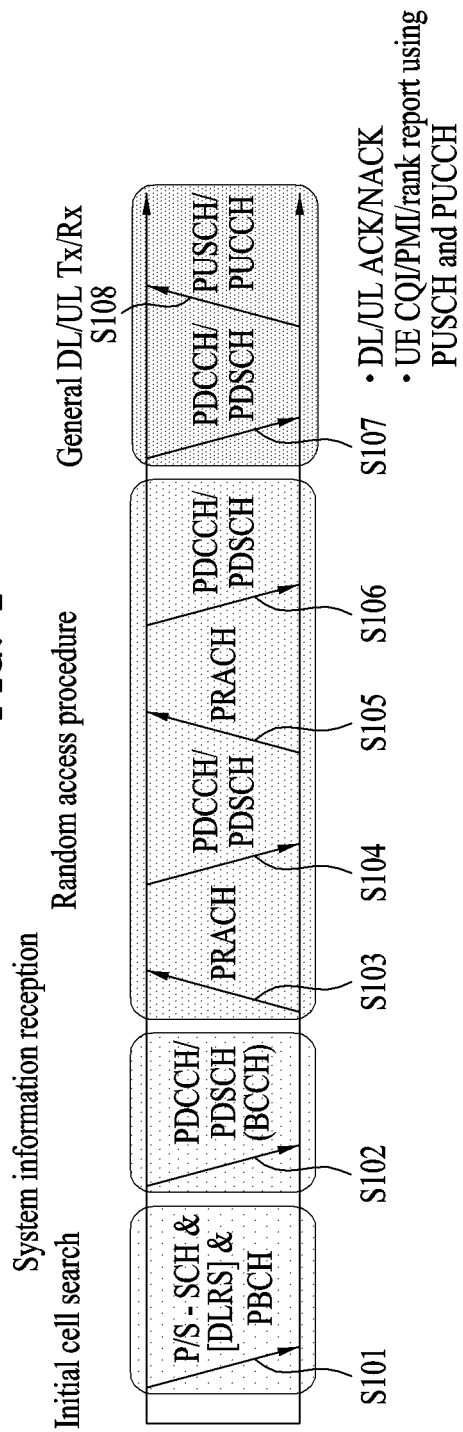
FIG. 1 is a diagram for explaining an example of physical channels used for LTE (-A) system and a general signal transmission method using the same.

FIG. 1 is a diagram for explaining an example of physical channels used for LTE (-A) system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel (PBCH) from the base station and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Subsequently, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above-mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure.

Figure 2:
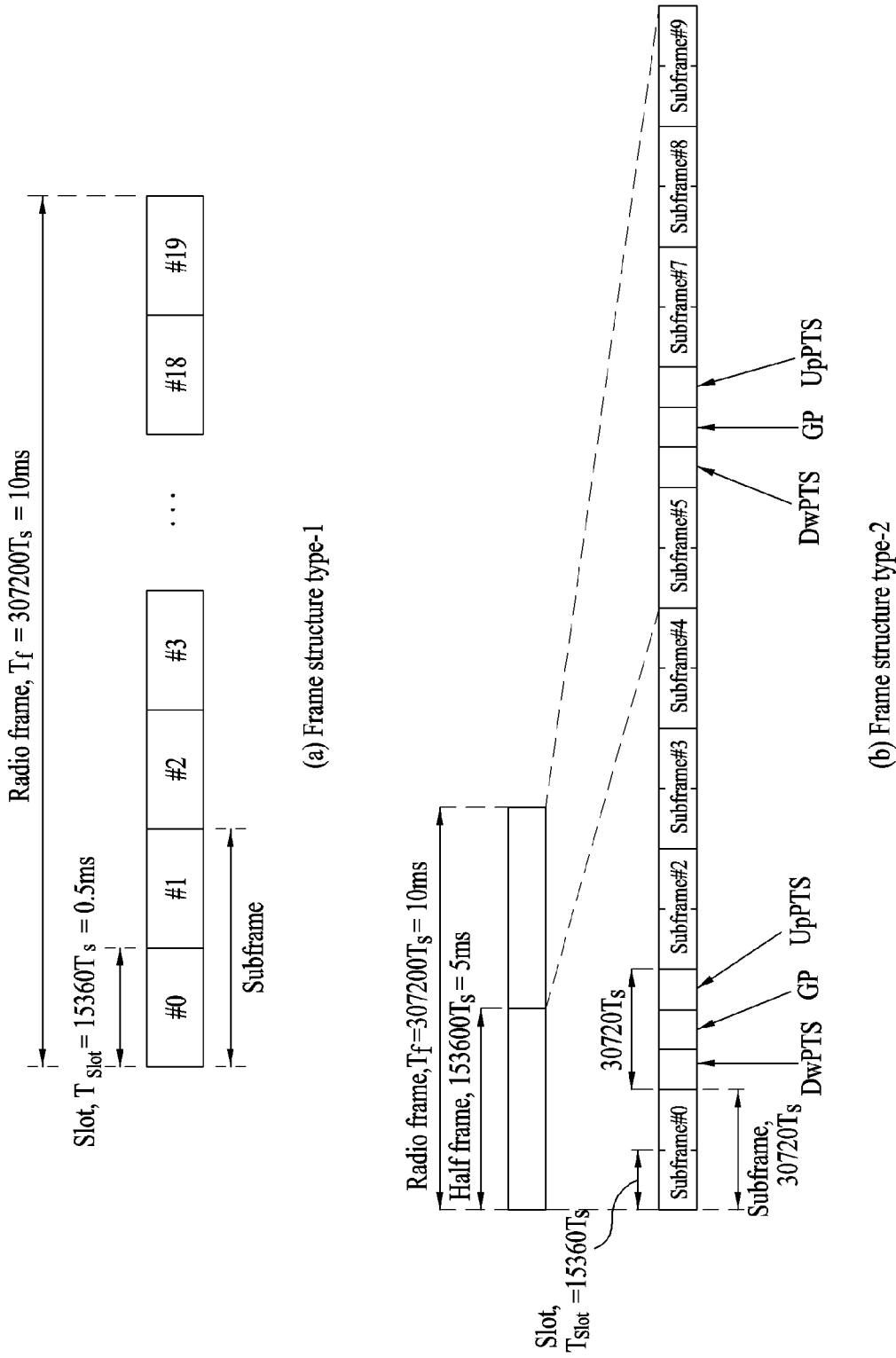
FIG. 2 is a diagram for explaining an example of a structure of a radio frame in LTE (-A) system.

FIG. 2 is a diagram for explaining an example of a structure of a radio frame in LTE (-A) system. Referring to FIG. 2, UL/DL (uplink/downlink) data packet transmission is performed by a unit of subframe. And, one subframe is defined as a time interval including a plurality of symbols. In the LTE (-A) standard, a type-1 radio frame structure applicable to FDD (frequency division duplex) and a type-2 radio frame structure applicable to TDD (time division duplex) are supported.

FIG. 2 (*a*) is a diagram for an example of a structure of a type 1 radio frame. A DL (downlink) radio frame includes 10 subframes. Each of the subframes includes 2 slots in time domain. For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE (-A) system uses OFDM in downlink, OFDM symbol is provided to indicate one symbol period. The OFDM symbol may be named SC- FDMA symbol or symbol period. Resource block (RB) is a resource allocation unit and may include a plurality of contiguous subcarriers in one slot.

The number of OFDM symbols included in one slot may vary in accordance with a configuration of a CP (cyclic prefix configuration). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2 (b) is a diagram for a structure of a type 2 radio frame. The type-2 radio frame includes 2 half frames. Each of the half frame includes 4 (5) normal subframes and 1 (0) special subframe. The normal subframe may be used for UL or DL according to an uplink-downlink configuration. Each of subframes includes 2 slots.

Figure 3:
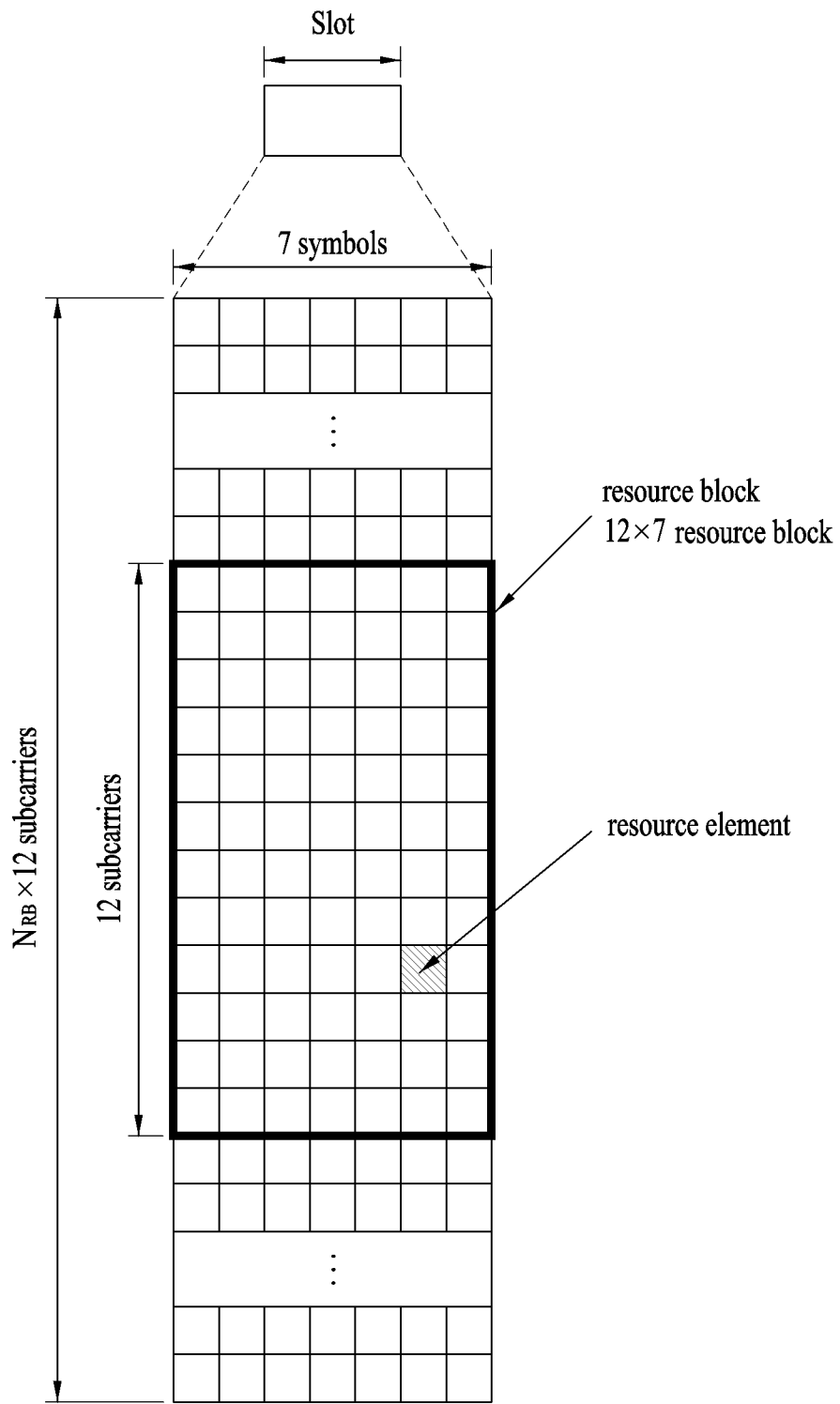
FIG. 3 is a diagram for an example of a resource grid for a downlink slot.

FIG. 3 is a diagram for an example of a resource grid for a downlink slot.

Referring to FIG. 3, one downlink (DL) slot may include a plurality of OFDM symbols in time domain. In particular, one DL slot includes 7 (6) OFDM symbols and a plurality of resource blocks (RBs). One resource block (RB) can include 12 subcarriers in frequency domain. Each element on a resource grid is called a resource element (hereinafter abbreviated RE). One RB includes 12×7(6) REs. The number $N_{RB}$ of resource blocks included in a DL slot may depend on a DL transmission bandwidth. And, a structure of an uplink (UL) slot may be identical to a structure of the DL slot, while an OFDM symbol is replaced with an SC-FDMA symbol.

Figure 4:
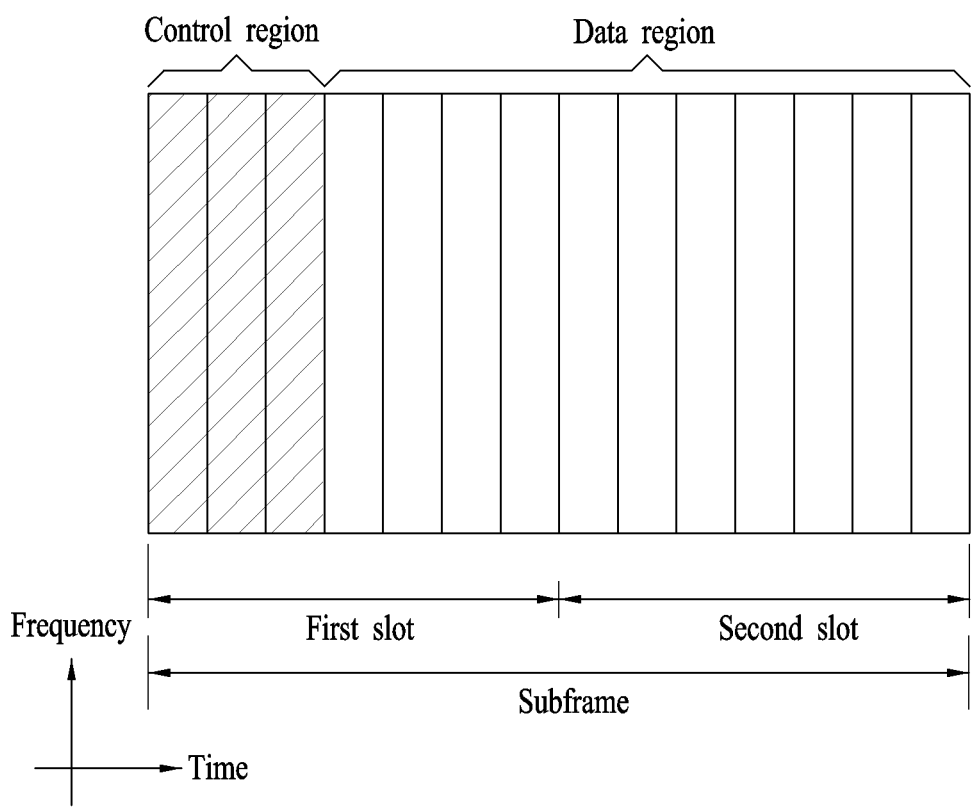
FIG. 4 is a diagram for an example of a structure of a downlink subframe.

FIG. 4 is a diagram for an example of a structure of a downlink subframe.

Referring to FIG. 4, maximum 3 (4) OFDM symbols situated in a head part of a first slot of one subframe correspond to a control region to which control channels are allocated. The rest of OFDM symbols correspond to a data region to which PDSCH (physical downlink shared channel) is assigned. Examples of DL control channels used by LTE (-A) may include PCFICH (Physical Control Format Indicator Channel), PDCCH (Physical Downlink Control Channel), PHICH (Physical hybrid ARQ indicator Channel) and the like.

The PCFICH is transmitted in a first OFDM symbol of a subframe and carries information on the number of OFDM symbols used for a transmission of a control channel within the subframe. The PCFICH includes 4 REGs (resource element groups). Each of the REGs is uniformly distributed to a control region based on a cell ID. The PCFICH indicates a value among 1 to 3 (or 2 to 4) and is modulated by QPSK (quadrature phase shift keying). PHICH carries a HARQ ACK/NACK signal in response to uplink transmission. The PHICH is assigned to remaining REGs where a CRS (cell-specific reference signal) and PCFICH are excluded from one or more OFDM symbols configured by PHICH duration.

PDCCH is assigned to first n number of OFDM symbols of a subframe (hereinafter called a control region). In this case, the n corresponds to an integer equal to or greater than 1. The n is indicated by PCFICH. Control information carried on PDCCH may be called downlink control information (DCI). A DCI format is defined by formats of 0, 3, 3A, and 4 for uplink and the DCI format is defined by formats of 1, 1A, 1B, 1C, 1D, 2, 2A, 2B, 2C and the like for downlink. For instance, the DCI format may be able to selectively include such information as a hopping flag, RB allocation, an MCS (modulation coding scheme), an RV (redundancy version), an NDI (new data indicator), a TPC (transmit power control), a cyclic shift DM-RS (demodulation reference signal), a CSI (channel state information) request, a HARQ process number, a TPMI (transmitted precoding matrix indicator), PMI (precoding matrix indicator) confirmation and the like according to a usage.

PDCCH is able to carry a transmission format of DL-SCH (downlink shared channel) and resource allocation information, a transmission format of UL-SCH (uplink shared channel) and resource allocation information, paging information on PCH (paging channel), system information on DL-SCH, resource allocation information of a higher layer control message such as a random access response transmitted on PDSCH, a transmit power control command set for individual user equipments within a user equipment group, a transmit power control command, indication information activating VoIP (voice over IP) and the like. A base station determines a PDCCH format in accordance with DCI to be transmitted to a user equipment and attaches a CRC (cyclic redundancy check) to control information. The CRC is masked with a unique identifier (RNTI (radio network temporary identifier)) in accordance with an owner or usage of PDCCH. If the PDCCH is provided for a specific user equipment, the CRC can be masked with a unique identifier of the user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, the CRC can be masked with a system information identifier (e.g., SI-RNTI (system information-RNTI). If PDCCH is used for a random access response, the CRC can be masked with RA-RNTI (random access-RNTI).

In general, a plurality of PDCCHs can be transmitted within a subframe. Each of the PDCCHs is transmitted using one or more CCEs (control channel elements) and each CCE includes 9 REGs. An REG includes 4 REs. A CCE is a logical allocation unit used for providing a coding rate based on radio channel status to PDCCH. A format of PDCCH and the number of PDCCH are determined according to the number of CCE (CCE aggregation level).

Table 1 in the following shows the number of CCE according to a PDCCH format, the number of REGs and the number of PDCCH bits.

TABLE 1

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |

TABLE 1-continued

| PDCCH format | Number of CCEs (n) | Number of REGs | Number of PDCCH bits |
|---|---|---|---|
| 3 | 8 | 72 | 576 |

CCEs are used in a manner of being numbered contiguously. In order to simplify a decoding process, a PDCCH format including n CCEs may start with CCE having a number equal to the multiple of n. The number of CCEs used for transmitting a specific PDCCH is determined by a base station in accordance with a channel condition. For instance, a single CCE may be sufficient for a PDCCH provided for a user equipment having a good DL channel (e.g., a case that the user equipment is located in the vicinity of a base station). On the other hand, in case of a user equipment having a poor channel (e.g., a case that the user equipment is located at a cell boundary), 8 CCEs can be used to obtain sufficient robustness. Besides, a power level of PDCCH may be adjusted according to the channel condition.

LTE (-A) defines a CCE position of a limited set where a PDCCH is able to be positioned for each of user equipments. The CCE position of a limited set (a limited CCE set or a limited PDCCH candidate set), which is necessary to be monitored by a user equipment to search for PDCCH of the user equipment, may be called a search space (SS). In this case, the monitoring performed by the user equipment includes decoding of each PDCCH candidate (blind decoding). In LTE (-A) system, a UE-specific search space (USS) and a common search space (CSS) are separately defined. The USS may be individually set for each of user equipments and the CSS is identically set to user equipments. The USS and the CSS can be overlapped with each other. A start point of the USS is UE-specifically hopping in each subframe. A size of the search space may vary according to a PDCCH format.

Table 2 in the following shows a size of CSS and a size of USS.

TABLE 2

| PDCCH format | Number of CCEs (n) | Number of PDCCH candidates in Common | Number of PDCCH candidates in UE-specific |
|---|---|---|---|
| 0 | 1 | — | 6 |
| 1 | 2 | — | 6 |
| 2 | 4 | 4 | 2 |
| 3 | 8 | 2 | 2 |

In order to make a calculation load of a user equipment due to a blind decoding (BD) attempt count to be under control, a user equipment does not search for all defined DCI formats at the same time. In general, the user equipment always searches for a DCI format 0 and a DCI format 1A in the USS. The DCI format 0 and the DCI format 1A are equal to each other in size and may be identified by a flag included in a message. And, the user equipment may be requested to receive an additional format (e.g., format 1, 1B, or 2 according to a PDSCH transmission mode set by a base station). The user equipment searches for a DCI format 1A and a DCI format 1C in the CSS. Moreover, the user equipment may be configured to search for a DCI format 3 or a DCI format 3A. In this case, the DCI format 3 and 3A may have a size identical to a size of the DCI format 0 and 1A. The user equipment may be able to identify a DCI format by scrambling a CRC using a (common) identifier different from each other, rather than a UE-specific identifier. PDSCH transmission scheme according to a transmission mode (TM) and information content of DCI formats are described in following.

Transmission Mode (TM)
   Transmission mode 1: transmission from a single antenna port of a base station
   Transmission mode 2: transmit diversity
   Transmission mode 3: open-loop spatial multiplexing
   Transmission mode 4: closed-loop spatial multiplexing
   Transmission mode 5: multi-user MIMO (multiple input multiple output)
   Transmission mode 6: closed-loop rank-1 precoding
   Transmission mode 7: single antenna port (port 5) transmission
   Transmission mode 8: double layers transmission (port 7 and 8) or single antenna port (port 7 or 8) transmission
   Transmission mode 9 to 10: maximum 8 layers transmission (port 7 to 14) or single antenna port (port 7 or 8) transmission DCI Format
   Format 0: resource grants for PUSCH transmissions
   Format 1: resource assignments for single codeword PDSCH transmissions (transmission modes 1, 2 and 7)
   Format 1A: compact signaling of resource assignments for single codeword PDSCH (all modes)
   Format 1B: compact resource assignments for PDSCH using rank-1 closed loop precoding (mode 6)
   Format 1C: very compact resource assignments for PDSCH (e.g. paging/broadcast system information)
   Format 1D: compact resource assignments for PDSCH using multi-user MIMO (mode 5)
   Format 2: resource assignments for PDSCH for closed-loop MIMO operation (mode 4)
   Format 2A: resource assignments for PDSCH for open-loop MIMO operation (mode 3)
   Format 3/3A: power control commands for PUCCH and PUSCH with 2-bit/1-bit power adjustment value
   Format 4: resource assignments for PUSCH transmission in cell to which multi-antenna port transmission mode is set A DCI format can be classified into a TM-dedicated format and a TM-common format. The TM-dedicated format corresponds to a DCI format set to a corresponding TM only. The TM-common format corresponds to a DCI format commonly set to all TMs. For instance, in case of the TM 8, the DCI format 2B may correspond to the TM-dedicated DCI format. In case of the TM 9, the DCI format 2C may correspond to the TM-dedicated DCI format. In case of the TM 10, the DCI format 2D may correspond to the TM-dedicated DCI format. And, the DCI format 1A may correspond to the TM-common DCI format.

Figure 5:
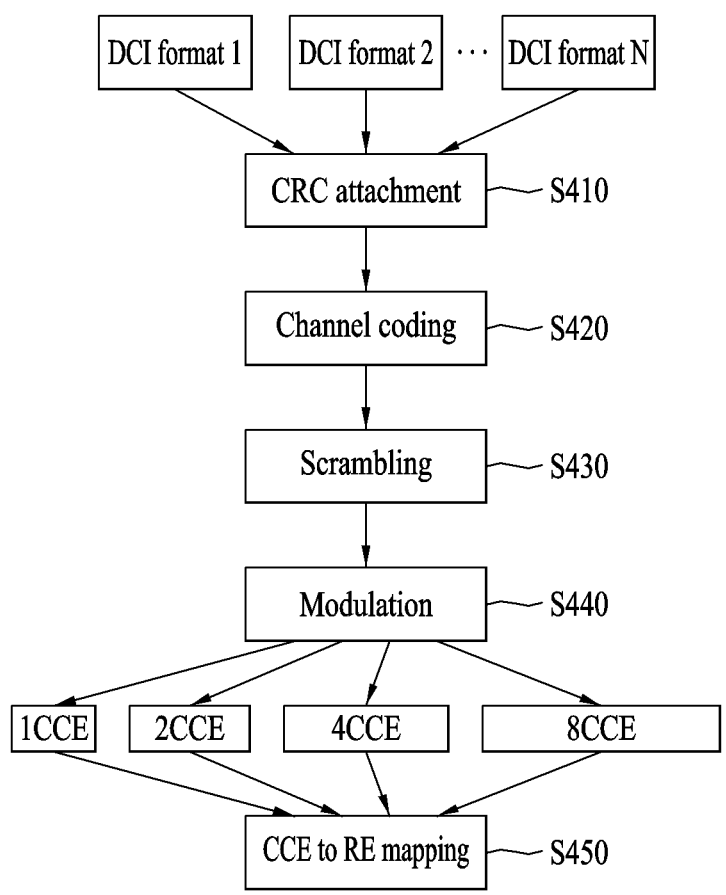
FIG. 5 is a flowchart for an example of PDCCH (physical downlink control channel) configured by a transmission end.

FIG. 5 shows an example of configuring PDCCH configured by a transmission end (e.g., base station).

Referring to FIG. 5, a base station generates control information according to a DCI format. The base station can select a single DCI format from a plurality of DCI formats (DCI format 1, 2, . . . , N) according to control information to be transmitted to a user equipment. In the step S410, a CRC is attached to the control information, which is generated according to each DCI format, to detect an error. The CRC is masked with an identifier (e.g., RNTI (radio network temporary identifier)) according to an owner of PDCCH or a usage. In other word, PDCCH is CRC-scrambled by an identifier (e.g., RNTI).

Table 3 in the following shows an example of identifiers masking PDCCH.

TABLE 3

| Type | Identifier | Description |
| --- | --- | --- |
| UE-specific | C-RNTI, temporary C-RNTI, semi-persistent C-RNTI | Used for unique identification of user equipment |
| Common | P-RNTI | Used for paging message |
|  | SI-RNTI | Used for system information |
|  | RA-RNTI | Used for random access response |

If a C-RNTI, a TC-RNTI (temporary C-RNTI), or an SPS C-RNTI (semi-persistent scheduling C-RNTI) is used, PDCCH carries control information for a specific user equipment. If the rest of RNTI is used, the PDCCH carries common control information by which all user equipments within a cell receive. In the step S420, the base station generates coded control information by performing a channel coding on the CRC attached control information. Transmission rate matching can be performed on the coded control information according to an assigned CCE aggregation level. In the step S430, the base station applies scrambling to the coded control information. The scrambling is applied to multiplexed control information. Specifically, a method of performing the scrambling is described in the following.

First of all, coded control information (e.g., coded DCI (including masked CRC)) to be transmitted on each control channel (i.e., PDCCH) is defined by a bit sequence $b^{(i)}(0), \ldots, b^{(i)}(M_{bit}^{(i)}-1)$. In this case, $M_{bit}^{(i)}$ indicates the number of bits transmitted on PDCCH #i of a subframe. In this case, multiplexed control information is given as follows.

$b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ In this case, $n_{PDCCH}$ corresponds to the number of PDCCHs transmitted in a subframe.

The bit sequence $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ is scrambled by a cell-specific sequence and the scrambled bit sequence is converted into $\tilde{b}(0), \ldots, \tilde{b}(M_{tot}-1)$. In this case, $M_{tot}$ indicates the number (or length) of bits of the multiplexed control information or the number (or length) of bits of a scrambling bit sequence.

Scrambling can be performed according to equation in the following.

$$\tilde{b}(i)=(b(i)+c(i))\bmod 2 \quad \text{[Equation 1]}$$

In this case, i ranges from 0 to $M_{tot}$, mod indicates Modulo calculation, and a scrambling sequence $c(i)$ can be obtained by an equation in the following.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 2]}$$

In this case, n ranges from 0 to $M_{PN}-1$, the $M_{PN}$ corresponds to a sequence length, $N_c$ corresponds to 1600, $x_1(0)=1$, $x_1(n)=0$, $n=1, 2, \ldots, 30$, and $c_{init}=\Sigma_{i=0}^{30} x_2(i) \cdot 2^i$.

$c_{init}$ corresponds to an initialization value used for generating a scrambling sequence. The $c_{init}$ is given by $\lfloor n_s/2 \rfloor 2^9 + N_{ID}^{cell}$. In this case, $n_s$ corresponds to a slot number in a radio frame, $n_{ID}^{cell}$ corresponds to a physical cell identifier, and $\lfloor \ \rfloor$ corresponds to a flooring function. A scrambling sequence generator according to equation 2 can be initialized to the $c_{init}$ in every subframe.

In the step S440, modulation symbols can be generated by modulating the scrambled control information. A CCE aggregation level of modulation symbols constructing a single PDCCH may correspond to one of 1, 2, 4 and 8. In the step S450, the modulation symbols are mapped to a resource element (RE) (CCE to RE mapping).

Figure 6:
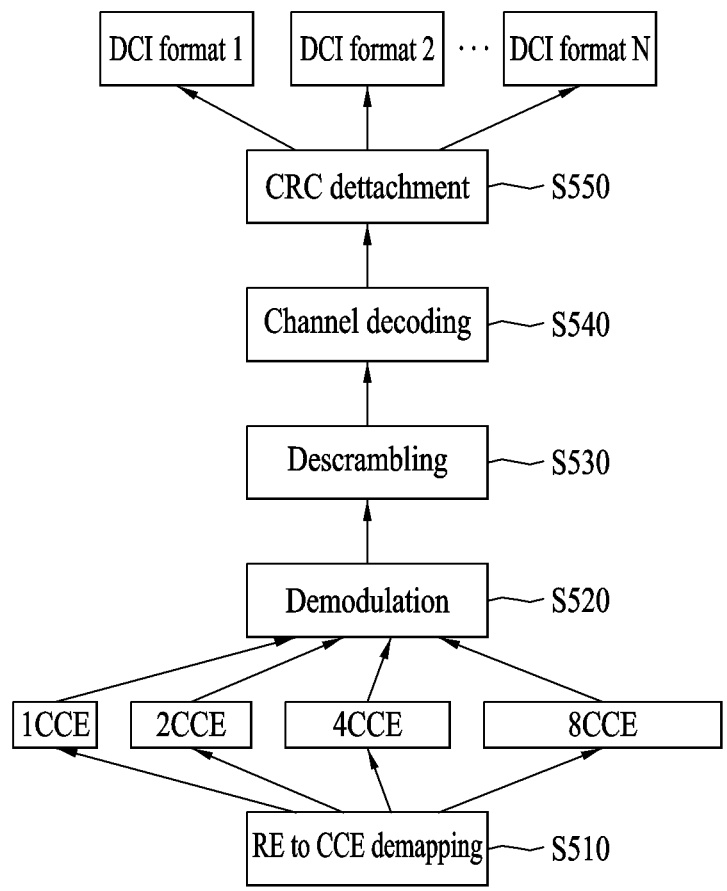
FIG. 6 is a flowchart for an example of processing PDCCH processed by a reception end.

FIG. 6 is a flowchart for an example of processing PDCCH processed by a reception end (e.g., user equipment).

Referring to FIG. 6, in the step S510, a user equipment de-maps a physical resource element to a CCE (CCE to RE de-mapping). In the step S520, since the user equipment does not know a CCE aggregation level necessary for receiving PDCCH, the user equipment performs demodulation on each of CCE aggregation levels. Rate de-matching can be performed for demodulated control information. In this case, since the user equipment does not know a DCI format (or DCI payload size) of control information to be received, the user equipment can perform rate de-matching for each of DCI formats (or DCI payload size).

In the step S530, the user equipment performs de-scrambling on demodulated control information $\tilde{b}(i)$ and generates descrambled control information $b(i)$. Descrambling can be performed according to an equation in the following. The $\tilde{b}(i)$ and the $b(i)$ are defined in the foregoing description.

$$b(i)=(\tilde{b}(i)+c(i))\bmod 2 \quad \text{[Equation 3]}$$

In this case, a scrambling sequence $c(i)$ can be obtained using equation 2.

In the step S540, the user equipment performs channel decoding on the descrambled control information $b(i)$ according to a code-rate and detects whether an error occurs by checking a CRC. In order to check whether an error occurs using the CRC, the user equipment descrambles (or de-masks) the CRC using identification information shown in Table 3. If an error does not occur, it indicates that the user equipment has detected PDCCH of the user equipment. If an error occurs, the user equipment continuously performs blind decoding on a different CCE aggregation level or a different DCI format (or DCI payload size). In the step S550, having detected the PDCCH of the user equipment, the user equipment eliminates a CRC from the decoded control information and obtains control information.

Figure 7:
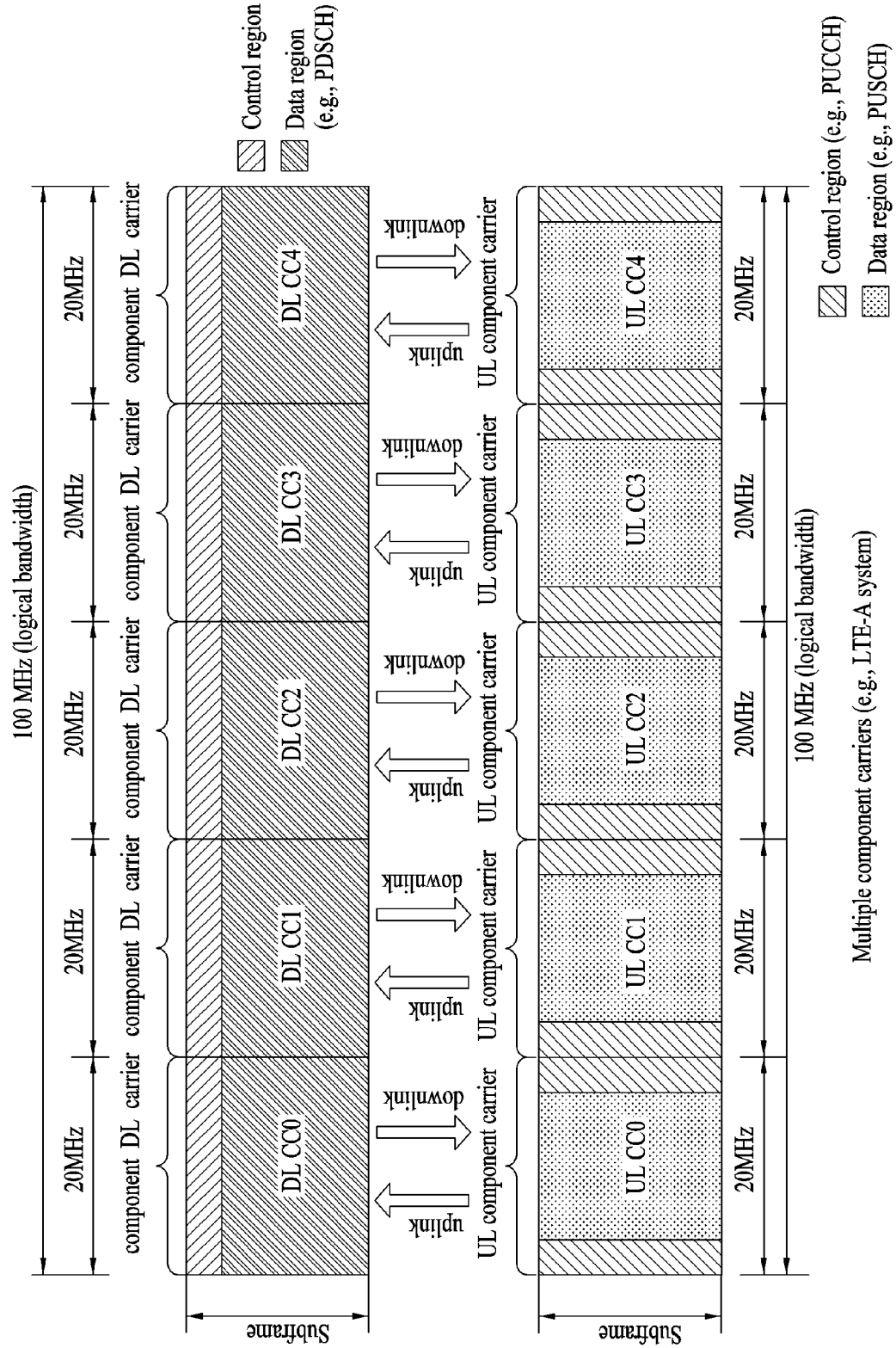
FIG. 7 is a diagram for an example of a carrier aggregation (CA) communication system.

FIG. 7 is a diagram for an example of a carrier aggregation (CA) communication system.

Referring to FIG. 7, a wider UL/DL bandwidth can be supported in a manner of aggregating a plurality of UL/DL component carriers (CC). Each of the component carriers may be adjacent to each other or non-adjacent to each other. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC. As one example, in case that a cross-carrier scheduling (or a cross-CC scheduling) is applied, PDCCH for DL assignment is transmitted on a DL CC #0 and a corresponding PDSCH can be transmitted on a DL CC #2. The terminology 'component carrier' can be replaced by such an equivalent terminology as a carrier, a cell, and the like.

For a cross-CC scheduling, a CIF (carrier indicator field) is used. A configuration informing whether a CIF exists or not within a PDCCH can be semi-statically and user-specifically (or user group-specifically) enabled via a higher layer signaling (e.g., RRC signaling). Basics of PDCCH transmission can be summarized as follows.

CIF disabled: PDCCH on DL CC assigns a PDSCH resource on the same DL CC or a PUSCH resource on a singly linked UL CC.
  No CIF
CIF enabled: PDCCH on DL CC assigns a PDSCH or PUSCH resource to one of multiply aggregated DL/UL CCs using a CIF.
  LTE DCI format expanded to have a CIF
    CIF (configured CIF) is stationary x-bit field (e.g., x=3)
    CIF (configured CIF) position is stationary irrespective of a DCI format size In case that a CIF exists within a PDCCH, a base station may be able to assign a monitoring DL CC (set) to reduce BD complexity of a user equipment side. For a scheduling of PDSCH/PUSCH, a user equipment may be able to perform a detection/decoding of the PDCCH on a corresponding DL CC only. In particular, the base station may be able to transmit the PDCCH via the monitoring DL CC only. The monitoring DL CC set may be configured UE-specifically, UE group-specifically or cell-specifically.

Figure 8:
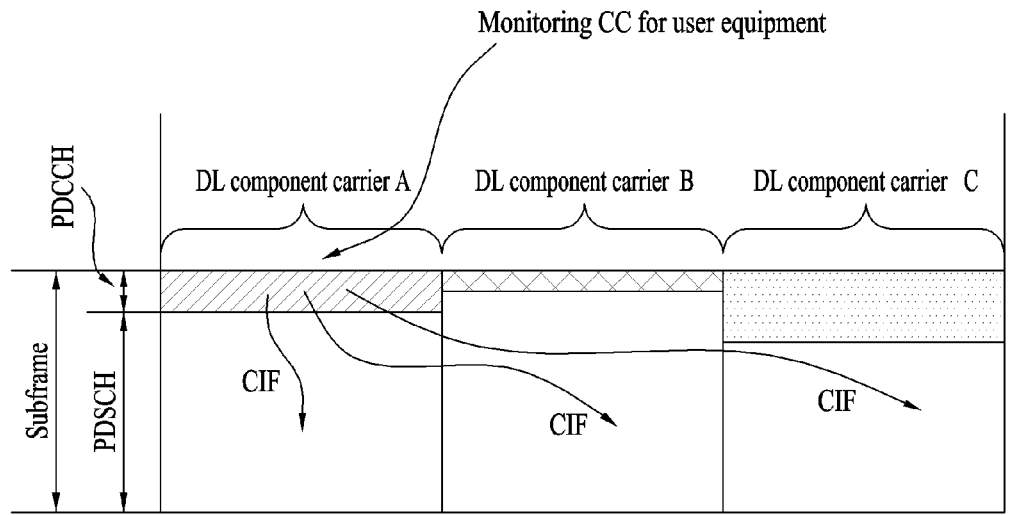
FIG. 8 is a diagram for an example of a cross-carrier scheduling.

FIG. 8 is a diagram for an example of a case that 3 DL CCs are aggregated and a DL CC A is configured as a monitoring DL CC. If a CIF is disabled, each of DL CCs may be able to transmit PDCCH, which schedules PDSCH of each of the DL CCs, without a CIF according to an LTE PDCCH rule. On the other hand, if the CIF is enabled by a higher layer signaling, only the DL CC A may be able to transmit the PDCCH, which schedules the PDSCH of a different DL CC as well as the PDSCH of the DL CC A using the CIF. PDCCH is not transmitted on a DL CC B and a DL CC C, which are not configured as a monitoring DL CC. In this case, such a terminology as a monitoring DL CC can be replaced by such an equivalent terminology as a monitoring carrier, a monitoring cell, a scheduling carrier, a scheduling cell, a serving carrier, a serving cell, and the like. A DL CC carrying a PDSCH corresponding to a PDCCH and a UL CC carrying a PUSCH corresponding to a PDCCH can be called a scheduled carrier, a scheduled cell or the like.

As mentioned earlier in FIG. 4, an FDD DL carrier and a TDD DL subframes use first n OFDM symbols of a subframe to transmit PDCCH, PHICH, PCFICH or the like, which is a physical channel used for transmitting various control information and use the rest of OFDM symbols to transmit PDSCH. The number of symbols used for transmitting a control channel in each subframe is delivered to a user equipment dynamically via such a physical channel as PCFICH and the like or semi-statically via an RRC signaling. The n value can be set from 1 symbol to maximum 4 symbols according to subframe property and system property (FDD/TDD, system bandwidth, etc.). Meanwhile, PDCCH, which is a physical channel used for transmitting DL/UL scheduling and various kinds of control information, is transmitted via a limited OFDM symbol in a legacy LTE system. Hence, an enhanced PDCCH (E-PDCCH), which is multiplexed with PDSCH more freely in a manner of using a FDM scheme, is introducing.

Figure 9:
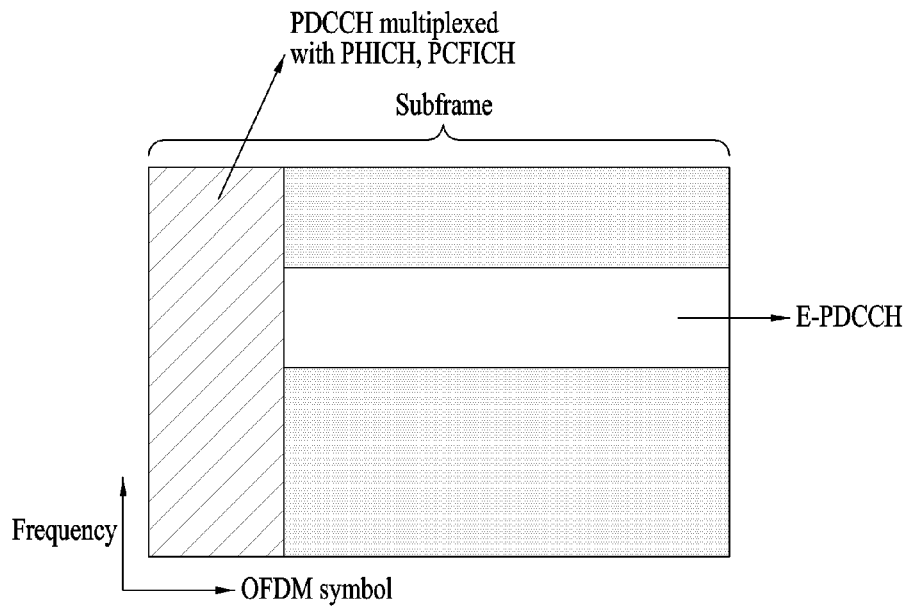
FIG. 9 is a diagram for an example of assigning E-PDCCH (enhanced PDCCH) to a data region of a subframe.

FIG. 9 is a diagram for an example of assigning E-PDCCH (enhanced PDCCH) to a data region of a subframe.

Referring to FIG. 9, PDCCH (for clarity, a legacy PDCCH (L-PDCCH)) according to a legacy LTE/LTE-A system can be assigned to a control region (refer to FIG. 4) of a subframe. An L-PDCCH region in the drawing means a region to which the legacy PDCCH is able to be assigned thereto. According to the context, the L-PDCCH region may mean a control region, a control channel resource region (i.e., CCE resource) capable of practically being assigned the PDCCH within the control region, or a PDCCH search space. Meanwhile, PDCCH can be additionally assigned to a data region (e.g., a resource region for PDSCH, refer to FIG. 4). The PDCCH assigned to the data region is called an E-PDCCH. As shown in the drawing, by additionally obtaining a control channel resource via the E-PDCCH, a scheduling limitation due to a limited control channel resource of the L-PDCCH region can be reduced. In the data region, E-PDCCH and PDSCH are multiplexed using FDM scheme.

Specifically, E-PDCCH can be detected and demodulated based on a DM-RS (demodulation reference signal). E-PDCCH has a structure of being transmitted over a PRB (physical resource block) pair in time axis. More specifically, a search space (SS) for detecting E-PDCCH can include one or a plurality of (e.g., 2) E-PDCCH sets. Each of the E-PDCCH sets can occupy a plurality of (e.g., 2, 4, or 8) PRB pairs. An e-CCE (enhanced CCE) constructing an E-PDCCH set can be mapped in a localized or distributed form (according to whether an e-CCE is distributed to a plurality of PRB pairs). And, if E-PDCCH-based scheduling is configured, it is able to designate a subframe in which E-PDCCH transmission/detection is to be performed. E-PDCCH can be configured in a USS only. A user equipment attempts to detect DCI for an L-PDCCH CSS and an E-PDCCH USS only in a subframe (hereinafter E-PDCCH subframe) in which E-PDCCH transmission is permitted. The user equipment attempts to detect DCI for the L-PDCCH CSS and an L-PDCCH USS in a subframe (i.e., non-E-PDCCH subframe) in which E-PDCCH transmission is not permitted.

Similar to L-PDCCH, E-PDCCH carries DCI. For instance, E-PDCCH is able to carry DL scheduling information and UL scheduling information. An E-PDCCH/PDSCH process and an E-PDCCH/PUSCH process are identical or similar to what is mentioned earlier with reference to the step S107 and the step S108 of FIG. 1. In particular, a user equipment receives E-PDCCH and may be then able to receive data/control information via PDSCH corresponding to the received E-PDCCH. And, the user equipment receives E-PDCCH and may be then able to transmit data/control information via PUSCH corresponding to the received E-PDCCH. Meanwhile, according to legacy LTE, a PDCCH candidate region (hereinafter PDCCH search space) is reserved in advance in a control region and PDCCH of a specific UE is transmitted to a partial region of the PDCCH search space. Hence, the UE can obtain PDCCH of the UE in the PDCCH search space via blind decoding. Similarly, E-PDCCH can also be transmitted over a part or all of resources reserved in advance.

Figure 10:
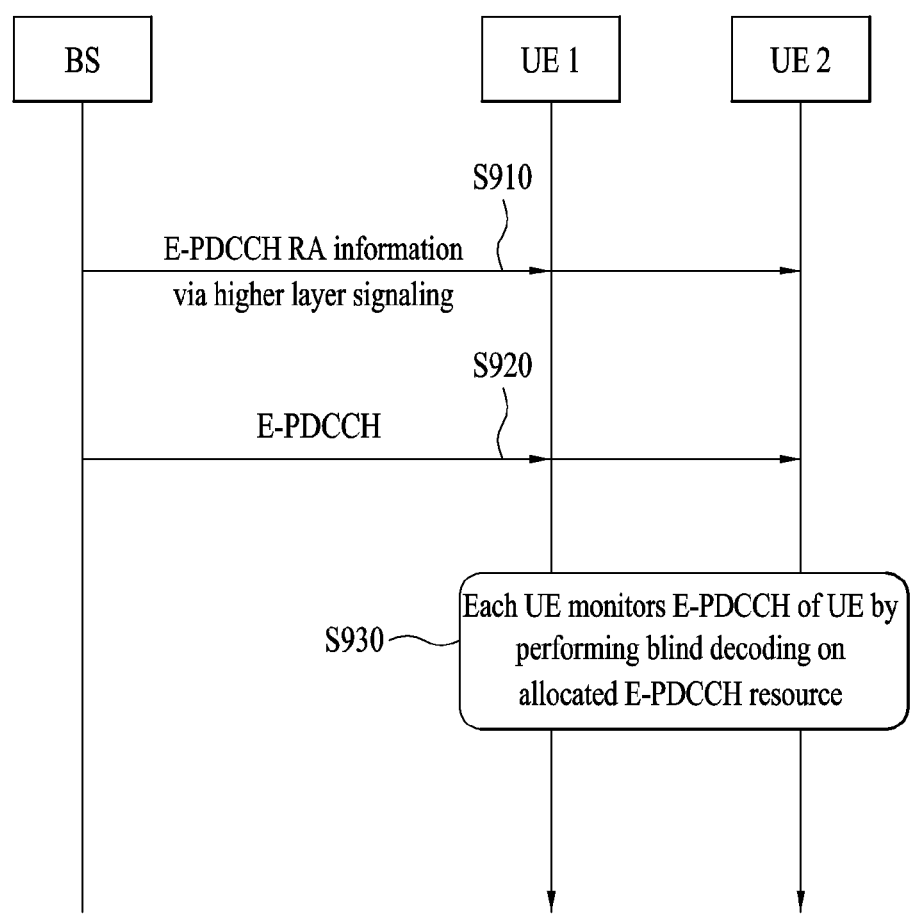
FIG. 10 is a flowchart for an example of resource allocation for E-PDCCH and a PDSCH reception process.

FIG. 10 is a flowchart for an example of resource allocation for E-PDCCH and an E-PDCCH reception process.

Referring to FIG. 10, a base station transmits E-PDCCH resource allocation (RA) information to a user equipment [S910]. The E-PDCCH RA information may include RB (or VRB (virtual resource block)) assignment information. The RB assignment information can be provided in an RB unit or an RBG (resource block group) unit. An RBG includes 2 or more contiguous RBs. The E-PDCCH RA information can be transmitted using a higher layer (e.g., RRC) signaling. In this case, the E-PDCCH RA information is used to reserve an E-PDCCH resource (region) (i.e., E-PDCCH set) in advance. Subsequently, the base station transmits the E-PDCCH to the user equipment [S920]. The E-PDCCH can be transmitted within a part or a whole of the region of the E-PDCCH resource (e.g., M RBs) reserved in the step S910. Hence, the user equipment monitors a resource (region) (hereinafter, E-PDCCH search space) to which the E-PD- CCH is able to be transmitted thereto [S930]. The E-PDCCH search space can be provided as a part of the RB set assigned in the step S910. In this case, monitoring may include blind decoding a plurality of E-PDCCH candidates in the search space. The blind decoding can be performed using a scrambling sequence applied to the E-PDCCH.

Figure 11:
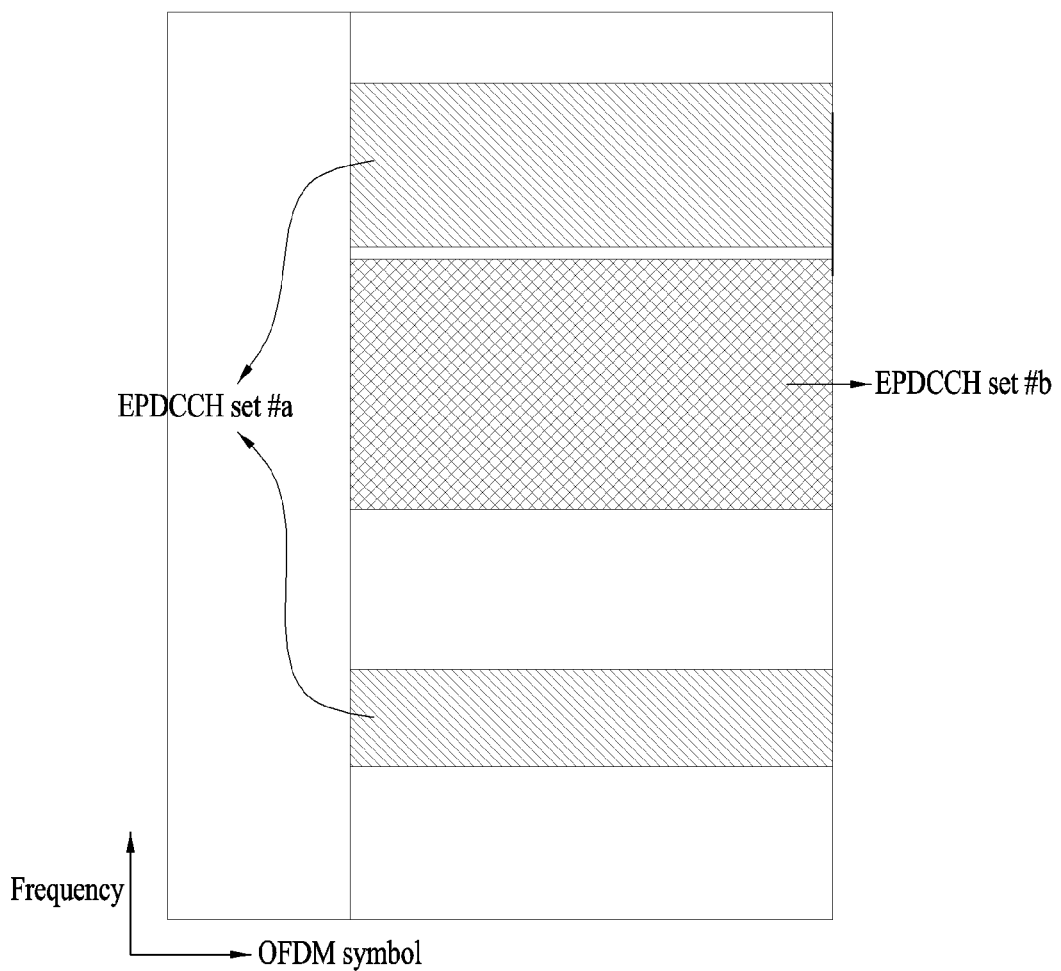
FIG. 11 is a diagram for an example of an E-PDCCH set.

FIG. 11 is a diagram for an example of an E-PDCCH set.

Referring to FIG. 11, K E-PDCCH set(s) can be configured per each CC or cell. In this case, the K may be equal to or greater than 1 and equal to or less than a specific limit (e.g., 2). And, each of the E-PDCCH set(s) can be configured with the N PRBs (belonging to a PDSCH region). In this case, the N value and PRB resource/index can be independently (i.e., set-specifically) assigned according to an E-PDCCH set. Hence, the number and indexes of e-CCE resources constructing each E-PDCCH set can be (UE-specifically) set-specifically configured. A PUCCH resource/index linked to each e-CCE resource/index can also be (UE-specifically) set-specifically assigned by independently configuring a start PUCCH resource/index according to an E-PDCCH set. In this case, e-CCE may represent a basic control channel unit of E-PDCCH, the basic control channel unit consisting of a plurality of REs (belonging to a PRB in a PDSCH region). A structure of the e-CCE may vary according to an E-PDCCH transmission mode. As an example, e-CCE for localized transmission can be configured using an RE belonging to an identical PRB pair. On the contrary, e-CCE for distributed transmission can be configured by REs extracted from a plurality of PRB pairs. Meanwhile, in case of a localized e-CCE, AP (antenna port)(s) can be independently used according to e-CCE resource/index to perform optimal beamforming for each user. On the contrary, in case of a distributed e-CCE, an identical AP set can be repeatedly used in e-CCEs different from each other to enable a plurality of users to commonly use AP(s).

Embodiment

E-PDCCH Scrambling

As mentioned earlier with reference to equation 2, a scrambling sequence generator, which is used for generating a cell-specific scrambling sequence for L-PDCCH in LTE, is initialized by a cell-specific value below at a start point of each subframe.

$$c_{init} = \lfloor n_s/2 \rfloor 2^9 + N_{ID}^{cell}$$

Meanwhile, it is preferable to determine an initialization value used for generating a scrambling sequence (simply, an initialization value) according to a type of a transmission channel. In relation to this, as depicted in FIG. 9, L-PDCCH is assigned to a control region of a subframe and E-PDCCH is assigned to a data region of a subframe. Hence, in case of generating E-PDCCH scrambling sequence, it is preferable to use an initialization value different from a legacy PDCCH.

In the following, an initialization value used for the E-PDCCH scrambling sequence is proposed. Unless it is specially mentioned, a scrambling/scrambling sequence corresponds to a scrambling/scrambling sequence applied to E-PDCCH payload (i.e., DCI). A scrambling/scrambling sequence applied to a CRC in DCI is distinguished from the scrambling/scrambling sequence applied to the E-PDCCH payload. Operations related to L-PDCCH (refer to FIGS. 5 to 6) can be identically/similarly applied to overall operations related to E-PDCCH transmission/reception.

E-PDCCH is multiplexed with PDSCH in a data region of a subframe using a FDM (frequency division multiplexing) scheme. Hence, it may consider a method of using a scrambling sequence initialization value for the E-PDCCH, which is used for PDSCH.

Currently, an initialization value used for a PDSCH scrambling sequence includes $n_{RNTI}$ related to PDSCH transmission as follows.

$$c_{init} = n_{RNTI} \cdot 2^{14} + q \cdot 2^{13} + \lfloor n_s/2 \rfloor \cdot 2^9 + N_{ID}^{cell} \text{ (q: codeword index, 0 or 1)} \quad \text{[Equation 4]}$$

In this case, $n_{RNTI}$ corresponds to an RNTI identifier of 16 bits (e.g., Table 3).

Hence, an initialization value of the E-PDCCH scrambling sequence can be defined as follows using a scheme identical to the aforementioned scheme.

$$c_{init} = n_{RNTI} \cdot 2^{14} + \lfloor n_s/2 \rfloor \cdot 2^9 + N_{ID}^{cell} \text{ (Single codeword)}$$

$$\text{(Or, } c_{init} = n_{RNTI} \cdot 2^{14} + q \cdot 2^{13} + \lfloor n_s/2 \rfloor \cdot 2^9 + N_{ID}^{cell} \text{ (Multiple codewords)} \quad \text{[Equation 5]}$$

In this case, a single codeword corresponds to a single DCI. Hence, the single codeword indicates a case that a single DCI is transmitted via a single E-PDCCH and multiple codewords indicate a case that a plurality of DCIs are transmitted via a single E-PDCCH.

In equation 5, $n_{RNTI}$ can be determined according to characteristics of a channel on which E-PDCCH is transmitted. For instance, in case of a UE-specific search space, it may consider C-RNTI, SPS C-RNTI, TC-RNTI and the like for the $n_{RNTI}$. Yet, since a common search space corresponds to a channel commonly demodulated by all UEs, the common search space may not have a UE-specific value. Hence, in case of the common search space, a value of the $n_{RNTI}$ can be determined by a single value in a cell. To this end, the value of the $n_{RNTI}$ may be defined in a PBCH region in an initial access procedure, may be delivered via RRC signaling, may be fixed (X) by a predetermined value, or may be set to 0.

In equation 5, $N_{ID}^{cell}$ may indicate an actual physical ID ($N_{ID}^{cell}$) in a corresponding cell or can be replaced with virtual identification information (e.g., a virtual cell ID (VCID)) as shown in the following.

$$c_{init} = X \cdot 2^{14} + \lfloor n_s/2 \rfloor \cdot 2^9 + ID \text{ (Or, } c_{init} = X \cdot 2^{14} + q \cdot 2^{13} + \lfloor n_s/2 \rfloor \cdot 2^9 + ID \text{ (multiple codewords)} \quad \text{[Equation 6]}$$

In this case, X corresponds to an integer (e.g., $n_{RNTI}$) including 0, q corresponds to an integer equal to or greater than 0 and ID includes a VCID. If the ID indicates a VCID, the ID may have a value ranging from 0 to 503, which is identical to a legacy physical cell ID.

Meanwhile, a common search space may be configured within a plurality of E-PDCCH sets. In this case, in order to enable a user equipment to identify a common search space which the user equipment wants to demodulate, $n_{RNTI}$ can be differently defined according to a common search space type.

And, in the aforementioned proposed method, a rule of receiving each control information using a predetermined RNTI different from each other can be defined according to a DCI type (e.g., a fallback DCI (e.g., a DCI type 1/1A) or TM-specific DCI (e.g., a DCI type 2C)) monitored by a user equipment. In this case, information on an RNTI associated with a specific DCI type can be implicitly identified by a predetermined rule. Or, a base station can inform a user equipment of the information via a predetermined signal (upper layer signaling or physical layer signaling). And, as an embodiment of the aforementioned method, the specific DCI type can be transmitted in a common search space or a UE-specific search space according to a predetermined rule.

In relation to E-PDCCH resource mapping, a preferred or an applicable transmission scheme may vary in a localized mode and a distributed mode, respectively. Accordingly, the aforementioned scrambling sequence initialization method may be modified. For instance, in the localized mode, a band of a good signal property is assigned via a frequency-selective scheduling scheme and data can be selectively transmitted to each user equipment. On the contrary, since the distributed mode corresponds to a transmission scheme preferred only when channel quality according to each band is not reported or wideband channel quality is reported only, it is preferred to have a transmission scheme capable of obtaining a spatial and/or frequency diversity and the like.

Hence, in the localized mode, a transmission is performed using a beamforming scheme by applying a dedicated precoding to each of user equipments using antenna ports different from each other, and a MU-MIMO (multi-user MIMO) scheme may be used for MIMO transmissions to multiple users by using multiple layers in order to increase transmission rate and/or cell capacity. Yet, in case of using MIMO, which uses an identical frequency/time resource and multiplexes in a spatial domain, interference may occur between user equipments. If a signal of a specific user equipment is interfered by signals of different user equipments and correlation occurs between the signals, it is more difficult to eliminate interference. Hence, it is necessary to make a UE signal and an interference signal to be independent from each other by randomizing the interference. Although source information of each user equipment is independently generated, codewords, which are generated by passing through a channel coding and the like, may not sufficiently maintain an independent property between user equipments. Hence, it is necessary to make the codewords to be independent from each other by randomizing each of the codewords. The randomizing can be performed via a UE-specific scrambling sequence.

As an example, in case of performing transmission of an E-PDCCH MU-MIMO scheme in a specific cell in the localized mode, a $n_{RNTI}$ value of a scrambling sequence can be initialized using UE-specific identification information to randomize interference as follows.

$$c_{init}=C_{RNTI} \cdot 2^{14}+q \cdot 2^{13}+\lfloor n_s/2 \rfloor \cdot 2^9+N_{ID}^{cell} \qquad \text{[Equation 7]}$$

In this case, $C_{RNTI}$ corresponds to a C-RNTI and q, $n_s$ and $N_{ID}^{cell}$ are identical to what is defined in the foregoing description.

Yet, since it may be not necessary to randomize interference in the distributed mode seeking a frequency diversity, spatial multiplexing or the like, it is not necessary to initialize the $n_{RNTI}$ value using UE-specific identification information (e.g., C-RNTI) and the like. Hence, it may be able to define a scrambling sequence initialization value using a scheme identical to a case of the aforementioned common search space in the distributed mode. Specifically, in case of the distributed mode, the $n_{RNTI}$ value of equation 5 can be defined in a PBCH region in an initial access procedure, may be delivered via RRC signaling, may be fixed by a predetermined value, or may be set to 0. And, in case of the distributed mode, $N_{ID}^{cell}$ of equation 5 may indicate an actual physical ID ($N_{ID}^{cell}$) of a corresponding cell or can be replaced with virtual identification information (e.g., a virtual cell ID (VCID)). In this case, the virtual identification information (e.g., a virtual cell ID) can be used as a concept of a group ID. In this case, it is able to transmit E-PDCCH, which is mapped in a manner of being distributed, by applying a virtual ID to a case where a group RNTI is required such as CoMP (cooperative multi point), MTC (machine-type communication) or the like. For instance, when a plurality of E-PDCCH sets are defined, a virtual ID different from each other can be applied per each of a plurality of the E-PDCCH sets (e.g., a ID1, an ID2 . . . ).

$$c_{init}=X \cdot 2^{14}+q \cdot 2^{13}+\lfloor n_s/2 \rfloor \cdot 2^9+ID_k \qquad \text{[Equation 8]}$$

In this case, X corresponds to an integer (e.g., $n_{RNTI}$) including 0, q corresponds to an integer equal to or greater than 0, k corresponds to an integer (e.g., 1, 2, . . . ) corresponding to a group ID or an E-PDCCH set ID, and $ID_k$ corresponds to identification information corresponding to a group ID #k or an E-PDCCH set ID #k. The q corresponds to 0 in case of a single codeword and corresponds to 0 or a positive integer in case of multiple codewords.

In equation 8, X may correspond to 0 and q may correspond to 0.

Figure 12:
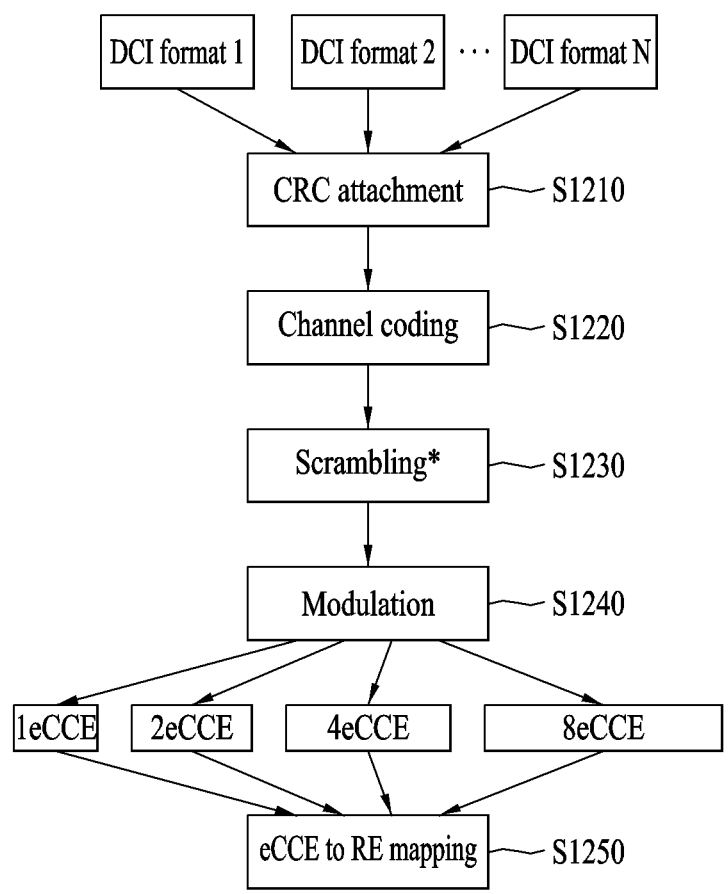
FIG. 12 is a flowchart for an example of configuring E-PDCCH configured by a transmission end according to the present invention.

FIG. 12 is a flowchart for an example of configuring E-PDCCH configured by a transmission end (e.g., a base station) according to the present invention. A basic procedure is identical to what is mentioned earlier in FIG. 5. The step S1210 to the step S1250 in FIG. 12 corresponds to the step S410 to the step S450 in FIG. 5. Hence, for detail explanation, it may refer to FIG. 5. A point different from FIG. 5 is to use an initialization value of equations 5 to 8 instead of a legacy $c_{init}=\Sigma_{i=0}^{30} x_2(i) \cdot 2^i = \lfloor n_s/2 \rfloor 2^9 + N_{ID}^{cell}$ as an initialization value for generating E-PDCCH scrambling sequence. In particular, in case of configuring a plurality of E-PDCCH sets in a single subframe, an initialization value of equation 8 can be used.

Figure 13:
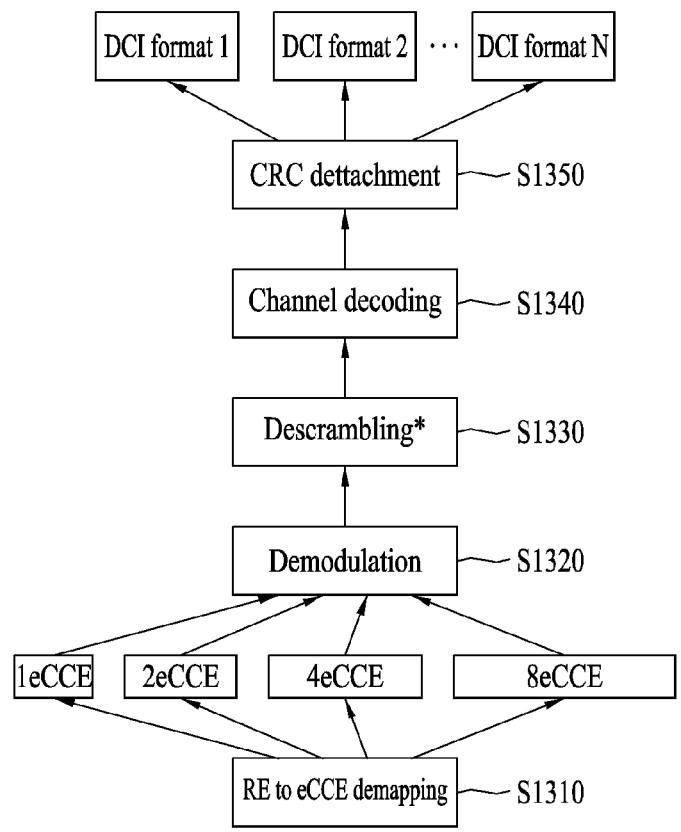
FIG. 13 is a flowchart for an example of processing E-PDCCH processed by a reception end according to the present invention.

FIG. 13 is a flowchart for an example of processing E-PDCCH processed by a reception end (e.g., a user equipment) according to the present invention. A basic procedure is identical to what is mentioned earlier in FIG. 6. The step S1310 to the step S1350 in FIG. 12 corresponds to the step S510 to the step S550 in FIG. 6. Hence, for detail explanation, it may refer to FIG. 6. A point different from FIG. 6 is to use an initialization value of equations 5 to 8 instead of a legacy $c_{init}=\Sigma_{i=0}^{30} x_2(i) \cdot 2^i = \lfloor n_s/2 \rfloor 2^9 + N_{ID}^{cell}$ as an initialization value for generating E-PDCCH scrambling sequence. In particular, in case of configuring a plurality of E-PDCCH sets in a single subframe, an initialization value of equation 8 can be used.

Figure 14:
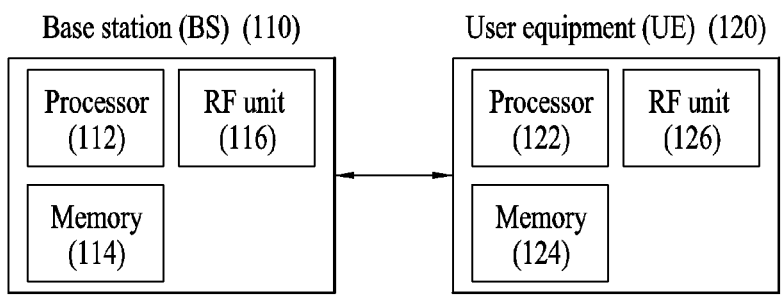
FIG. 14 is a diagram for an example of a base station and a user equipment applicable to the present invention.

FIG. 14 is a diagram for an example of a base station and a user equipment applicable to the present invention. In case that a system includes a relay, the base station or the user equipment can be replaced by the relay.

Referring to FIG. 14, a wireless communication system includes a base station (BS) 110 and a user equipment (UE) 120. The base station 110 includes a processor 112, a memory 114 and a radio frequency (RF) unit 116. The processor 112 can be configured to implement the procedure and/or methods proposed by the present invention. The memory 114 is connected to the processor 112 and configured to store various information related to the operation of the processor 112. The RF unit 116 is connected to the processor 112 and configured to transmit and/or receive a radio signal. The user equipment 120 includes a processor 122, a memory 124 and a radio frequency (RF) unit 126. The processor 122 can be configured to implement the procedure and/or methods proposed by the present invention. The memory 124 is connected to the processor 122 and configured to store various information related to the operation of the processor 122. The RF unit 126 is connected to the processor 122 and configured to transmit and/or receive a radio signal. The base station 110 and/or the user equipment 120 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the signal transmission/reception relations between a user equipment and a base station. In this disclosure, a specific operation explained as performed by a base station can be occasionally performed by an upper node of the base station. In particular, in a network constructed with a plurality of network nodes including a base station, it is apparent that various operations performed for communication with a user equipment can be performed by a base station or other networks except the base station. In this case, 'base station' can be replaced by such a terminology as a fixed station, a Node B, an eNode B (eNB), an access point, and the like. And, 'user equipment' can be replaced by such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention can be used by such a wireless communication device as a user equipment device, a relay, a base station, and the like.

What is claimed is:

1. A method of receiving a control channel signal by a user equipment in a wireless communication system, the method comprising:
receiving a subframe containing a plurality of control channel sets, wherein each of a plurality of the control channel sets contains a plurality of control channel candidates; and
monitoring at least one control channel set in the subframe for receiving the control channel signal,
wherein a plurality of the control channel candidates in each of a plurality of the control channel sets are scrambled by a scrambling sequence, and an initialization value of the scrambling sequence is $c_{init}$ of a following equation as an initialization value:

$$c_{init}=X \cdot 2^{14}+q \cdot 2^{13}+\lfloor n_s/2 \rfloor \cdot 2^9+ID_k \qquad \text{Equation}$$

where, X is to an integer containing 0, q is to an integer containing 0, $n_s$ is a slot number in a radio frame, $ID_k$ is identification information defined for a control channel set #k, and $\lfloor \ \rfloor$ is a flooring function.

2. The method of claim 1, wherein X=0 and q=0.

3. The method of claim 1, wherein the scrambling sequence c(n) is given by a following equation:

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \qquad \text{Equation}$$

where, n=0, 1, ..., MPN−1, MPN is a sequence length, NC=1600, x1(0)=1, x1(n)=0, n=1, 2, ..., 30, $\Sigma_{i=0}^{30} x_2(i) \cdot 2^i = c_{init} = X \cdot 2^{14}+q \cdot 2^{13}+\lfloor n_s/2 \rfloor \cdot 2^9+ID_k$.

4. The method of claim 1, wherein the control channel signal is an E-PDCCH (enhanced physical downlink control channel) signal, the plurality of the control channel sets is a plurality of E-PDCCH sets, and the plurality of the control channel candidates is a plurality of E-PDCCH candidates.

5. The method of claim 1, wherein the monitoring comprises decoding each of the plurality of the control channel candidates in a corresponding control channel set using the scrambling sequence.

6. The method of claim 1, further comprising: receiving an RRC (radio resource control) message containing RB (resource block) allocation information on each of the plurality of the control channel sets.

7. The method of claim 1, wherein the plurality of the control channel candidates is multiplexed with PDSCH (physical downlink shared channel) in the subframe using an FDM (frequency division multiplexing) scheme.

8. A user equipment configured to receive a control channel signal in a wireless communication system, comprising:
an RF (radio frequency) unit; and
a processor, the processor configured to receive a subframe containing a plurality of control channel sets, wherein each of a plurality of the control channel sets contains a plurality of control channel candidates, the processor configured to monitor at least one control channel set in the subframe for receiving the control channel signal, wherein a plurality of the control channel candidates in each of a plurality of the control channel sets are scrambled by a scrambling sequence, and an initialization value of the scrambling sequence is $c_{init}$ of a following equation as an initialization value:

$$c_{init}=X \cdot 2^{14}+q \cdot 2^{13}+\lfloor n_s/2 \rfloor \cdot 2^9+ID_k \qquad \text{Equation}$$

where, X is an integer containing 0, q is an integer containing 0, $n_s$ is a slot number in a radio frame, $ID_k$ is identification information defined for a control channel set #k, and $\lfloor \; \rfloor$ is a flooring function.

9. The user equipment of claim 8, wherein X=0 and q=0.

10. The user equipment of claim 8, wherein the scrambling sequence c(n) is given by a following equation:

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \qquad \text{Equation}$$

where, n=0, 1, . . . , MPN−1, MPN is a sequence length, NC=1600, x1(0)=1, x1(n)=0, n=1, 2, . . . , 30, and $\sum_{i=0}^{30} x_2(i) \cdot 2^i = c_{init} = X \cdot 2^{14}+q \cdot 2^{13}+\lfloor n_s/2 \rfloor \cdot 2^9+ID_k$.

11. The user equipment of claim 8, wherein the control channel signal is an E-PDCCH (enhanced physical downlink control channel) signal, the plurality of the control channel sets is a plurality of E-PDCCH sets, and the plurality of the control channel candidates is a plurality of E-PDCCH candidates.

12. The user equipment of claim 8, wherein the monitoring comprises decoding each of the plurality of the control channel candidates in a corresponding control channel set using the scrambling sequence.

13. The user equipment of claim 8, wherein the processor is configured to receive an RRC (radio resource control) message containing RB (resource block) allocation information on each of the plurality of the control channel sets.

14. The user equipment of claim 8, wherein the plurality of the control channel candidates is multiplexed with PDSCH (physical downlink shared channel) in the subframe using an FDM (frequency division multiplexing) scheme.

* * * * *